(12) United States Patent
Maydiga et al.

(10) Patent No.: US 12,038,783 B1
(45) Date of Patent: Jul. 16, 2024

(54) SYSTEM AND METHOD FOR FAULT TOLERANT TIME SYNCHRONIZATION

(71) Applicant: GM Global Technology Operations LLC, Detroit, MI (US)

(72) Inventors: Sudhakaran Maydiga, Troy, MI (US); Steve DiBella, Troy, MI (US); Subhash Vijaya Doddachikkaveeranna, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 18/166,092

(22) Filed: Feb. 8, 2023

(51) Int. Cl.
*G06F 1/14* (2006.01)
*G06F 1/12* (2006.01)

(52) U.S. Cl.
CPC . *G06F 1/12* (2013.01); *G06F 1/14* (2013.01)

(58) Field of Classification Search
CPC .................................. G06F 1/12; G06F 1/14
See application file for complete search history.

(56) References Cited

U.S. PATENT DOCUMENTS

| | | | | |
|---|---|---|---|---|
| 6,229,526 B1* | 5/2001 | Berstis | ................... | G05G 9/047 345/157 |
| 2004/0230347 A1* | 11/2004 | Sakurai | ................... | F02D 37/02 701/1 |
| 2007/0115100 A1* | 5/2007 | Mandle | ................... | B60R 25/04 340/426.11 |
| 2016/0315757 A1* | 10/2016 | Malekpour | ......... | G06F 11/1675 |
| 2017/0170900 A1* | 6/2017 | Petrucci | ................. | H04B 10/27 |
| 2019/0137940 A1* | 5/2019 | Jentz | ........................ | G04F 3/08 |
| 2020/0280829 A1* | 9/2020 | Benefield | ................ | H04W 4/46 |
| 2022/0258750 A1* | 8/2022 | Huq | ................... | B60W 50/0205 |
| 2023/0137019 A1* | 5/2023 | Kim | ........................ | H04B 7/04 455/524 |
| 2023/0341559 A1* | 10/2023 | Sapp | ..................... | G01S 19/256 |

* cited by examiner

*Primary Examiner* — Phil K Nguyen
(74) *Attorney, Agent, or Firm* — Vivacqua Crane, PLLC

(57) ABSTRACT

A system for synchronization of multiple clocks in a vehicle network includes a processor that is programmed to synchronize a time follower clock to a primary grand leader clock. The primary grand leader clock is monitored and the time follower clock is synchronized to a standby grand leader clock upon a failure of the primary grand leader clock. The time follower clock is synchronized to the primary grand leader clock if a new ignition cycle has occurred between a failure of the primary grand leader clock and a recovery after failure of the primary grand leader clock. The time follower clock continues to be synchronized to the standby grand leader clock if a new ignition cycle has not occurred between the failure of the primary grand leader clock and the recovery after failure of the primary grand leader clock.

20 Claims, 8 Drawing Sheets

SYSTEM AND METHOD FOR FAULT TOLERANT TIME SYNCHRONIZATION

INTRODUCTION

The present disclosure relates to time synchronization and, more particularly, to systems and methods for synchronizing multiple clocks in a vehicle network.

Many modern vehicles, such as autonomous vehicles (AV) and vehicles with Advanced Driving Assistance Systems (ADAS), have numerous applications that are time critical. These applications include motion planning systems that use cameras, lidar, radar, and other sensors that use sensor fusion; systems for the transmission and reception of real-time audio and video streams; and backbones for synchronizing various physical domains of the vehicle. Therefore, precise time synchronization, i.e., the process of coordinating independent clocks in a system into a common time, is important. Additionally, time synchronization may need to be fault tolerant for certain automation levels and operational domains. However, time synchronization systems may fail to account for certain conditions.

Thus, while time synchronization systems achieve their intended purpose, there is a need for a new and improved system and method for time synchronization.

SUMMARY

An improved system for time synchronization which accounts for events such a failure and a subsequent recovery of a primary grand leader clock enables continued accurate synchronization of multiple clocks when these events occur. This ensures accurate time stamping of sensor data, synchronized sensor capture of a vehicle environment, and synchronized execution of application software clusters. Additionally, the improved time synchronization system enables improved in-vehicle control with better synchronization of sensing data from the cloud or data from V2X (vehicle to everything)/infrastructure-based sensors. Accurate time stamping of state changes and error event logs also helps with generation of precise diagnostics for the vehicle.

According to several aspects, a system for synchronization of multiple clocks in a vehicle network is disclosed. The system includes a processor and a memory, the memory including instructions such that the processor is programmed to synchronize a time follower clock in the vehicle network to a primary grand leader clock upon initialization of an ignition cycle and monitor the primary grand leader clock to detect a failure of the primary grand leader clock and to detect a recovery after failure of the primary grand leader clock. The processor is programmed to synchronize the time follower clock to a standby grand leader clock upon the failure of the primary grand leader clock and determine whether a new ignition cycle has occurred between the failure of the primary grand leader clock and the recovery after failure of the primary grand leader clock. The processor is programmed to synchronize the time follower clock to the primary grand leader clock if a new ignition cycle has occurred between the failure of the primary grand leader clock and the recovery after failure of the primary grand leader clock and continue to synchronize the time follower clock to the standby grand leader clock if a new ignition cycle has not occurred between the failure of the primary grand leader clock and the recovery after failure of the primary grand leader clock.

In another aspect, the vehicle network is an Ethernet network.

In another aspect, a node of the time follower clock is in electronic communication with a node of the primary grand leader clock and a node of the standby grand leader clock via switches and links in a redundant manner.

In another aspect, the processor is further programmed to generate a first primary replicated clock for a first time domain and a second primary replicated clock for a second time domain. The processor is programmed to designate the first primary replicated clock as a highest priority clock for synchronization of the time follower clock when synchronization to the primary grand leader clock is indicated and all relevant primary links are available and designate the second primary replicated clock as a redundant primary clock for synchronization of the time follower clock when synchronization to the primary grand leader clock is indicated and a corresponding relevant primary link is unavailable.

In another aspect, the processor is further programmed to generate a first standby replicated clock for a first time domain and a second standby replicated clock for a second time domain. The processor is programmed to designate the first standby replicated clock as a highest priority clock for synchronization of the time follower clock when synchronization to the standby grand leader clock is indicated and all relevant standby links are available and designate the second standby replicated clock as a redundant standby clock for synchronization of the time follower clock when synchronization to the standby grand leader clock is indicated and a relevant standby link is unavailable.

In another aspect, the processor is further programmed to determine a current time of the time follower clock based on a current time of a synchronizing clock and a set of time parameters corresponding to a path between the time follower clock and the synchronizing clock.

In another aspect, the processor is programmed to designate a default primary time domain associated with a first path between the time follower clock and the primary grand leader clock and designate a redundant primary time domain associated with a second path between the time follower clock and the primary grand leader clock. The processor is programmed to monitor whether a relevant primary link of the first path is unavailable when the primary grand leader clock is the synchronizing clock. When the primary grand leader clock is the synchronizing clock, the current time of the time follower clock is determined based on the default primary time domain when all relevant primary links are available and is determined based on the redundant primary time domain when a relevant primary link is unavailable.

In another aspect, the processor is further programmed to designate a default standby time domain associated with a first path between the time follower clock and the standby grand leader clock and designate a redundant primary time domain associated with a second path between the time follower clock and the standby grand leader clock. The processor is programmed to monitor whether a relevant standby link of the first path is unavailable when the standby grand leader clock is the synchronizing clock. When the standby grand leader clock is the synchronizing clock, the current time of the time follower clock is determined based on the default standby time domain when all relevant standby links are available and is determined based on the redundant standby time domain when a relevant standby link is unavailable.

According to several aspects, a system for synchronization of multiple clocks in a vehicle network is disclosed. The system includes a processor and a memory, the memory including instructions such that the processor is programmed to synchronize each time follower clock of a set of time follower clocks in the vehicle network to a primary grand leader clock via a corresponding predetermined primary time domain of multiple time domains and synchronize a standby grand leader clock in the vehicle network to the primary grand leader clock via a corresponding predetermined primary time domain of the multiple time domains. The processor is programmed to monitor the primary grand leader clock to detect a failure of the primary grand leader clock and to detect a recovery after a failure of the primary grand leader clock and synchronize, upon the failure of the primary grand leader clock, each time follower clock to the standby grand leader clock via a corresponding predetermined standby time domain of the multiple time domains. The processor is programmed to determine whether a new ignition cycle has occurred between a failure of the primary grand leader clock and a recovery after a failure of the primary grand leader clock. The processor is further programmed to synchronize each time follower clock to the primary grand leader clock via the corresponding predetermined primary time domain if a new ignition cycle has occurred between a failure of the primary grand leader clock and a recovery after failure of the primary grand leader clock and continue to synchronize each time follower clock to the standby grand leader clock via the corresponding predetermined standby time domain if a new ignition cycle has not occurred between a failure of the primary grand leader clock and a recovery after failure of the primary grand leader clock.

In an aspect, the system further includes a clock selector module enabled to select a default or a redundant primary time domain from the multiple time domains for synchronization of each time follower clock to the primary grand leader clock in accordance with link conditions.

In another aspect, the clock selector module is enabled to select a default or a redundant standby time domain from the multiple time domains for synchronization of each time follower clock to the standby grand leader clock in accordance with link conditions.

In another aspect, the clock selector module is enabled to select a default or a redundant primary time domain from the multiple time domains for synchronization of the standby grand leader clock to the primary grand leader clock in accordance with link conditions.

According to several aspects, a method for synchronization of multiple clocks in a vehicle network is disclosed. The method includes synchronizing a time follower clock in the vehicle network to a primary grand leader clock upon initialization of an ignition cycle and detecting a failure of the primary grand leader clock and a recovery after failure of the primary grand leader clock The method includes synchronizing the time follower clock to a standby grand leader clock upon the failure of the primary grand leader clock. The method further includes determining that a new ignition cycle has not occurred between the failure of the primary grand leader clock and the recovery after failure of the primary grand leader clock and maintaining synchronization of the time follower clock with the standby grand leader clock after determining that a new ignition cycle has not occurred between the failure of the primary grand leader clock and the recovery after failure of the primary grand leader clock.

In another aspect, the vehicle network is an Ethernet network.

In another aspect, the vehicle network is a redundant network for a node of the time follower clock with respect to a node of the primary grand leader clock.

In another aspect, the method further includes designating a default primary time domain for synchronization of the time follower clock to the primary grand leader clock and designating a redundant primary time domain for synchronization of the time follower clock to the primary grand leader clock for when a relevant primary link is unavailable and monitoring availability of relevant primary links. The method includes synchronizing the time follower clock to the primary grand leader clock via the default primary time domain when synchronization with the primary grand leader clock is indicated and all relevant primary links are available and synchronizing the time follower clock to the primary grand leader clock via the redundant primary time domain when synchronization with the primary grand leader clock is indicated and a relevant primary link is unavailable.

In another aspect, the method includes designating a default standby time domain for synchronization of the time follower clock to the standby grand leader clock and designating a redundant standby time domain as a redundant time domain for synchronization of the time follower clock to the standby grand leader clock for when a relevant standby link is unavailable. The method includes monitoring availability of relevant standby links. The method includes synchronizing the time follower clock to the standby grand leader clock via the default standby time domain when synchronization with the standby grand leader clock is indicated and all relevant standby links are available and synchronizing the time follower clock with the standby grand leader clock via the redundant standby time domain when synchronization with the standby grand leader clock is indicated and a relevant standby link is unavailable.

In another aspect, the method includes designating a default primary time domain for synchronization of the standby grand leader clock to the primary grand leader clock and designating a redundant primary time domain for synchronization of the standby grand leader clock to the primary grand leader clock for when a relevant primary link is unavailable. The method includes monitoring availability of relevant primary links, synchronizing the standby grand leader clock to the primary grand leader clock via the default primary time domain when synchronization with the primary grand leader clock is indicated and all relevant primary links are available, and synchronizing the standby grand leader clock to the primary grand leader clock via the redundant primary time domain when synchronization with the primary grand leader clock is indicated and a relevant primary link is unavailable.

In another aspect, the method includes generating a first primary replicated clock for a first time domain and a second primary replicated clock for a second time domain. The method further includes designating, for each time follower clock of a set of time follower clocks in the vehicle network, the first primary replicated clock or the second primary replicated clock to be a corresponding highest priority clock and selecting, for each time follower clock of the set of time follower clocks, a corresponding highest priority clock for synchronization of the time follower clock with the primary grand leader clock when all relevant links are available and synchronization with the primary grand leader clock is indicated.

In another aspect, the method includes generating a first standby replicated clock for a first time domain and a second standby replicated clock for a second time domain. The method includes designating, for each time follower clock of a set of time follower clocks in the vehicle network, the first standby replicated clock or the second standby replicated clock to be a corresponding higher priority clock and selecting, for each time follower clock of the set of time follower clocks, a corresponding higher priority clock for synchronization of the time follower clock with the standby grand leader clock when all relevant links are available and synchronization with the standby grand leader clock is indicated.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides a vehicle equipped with a control system that provides synchronization of multiple clocks in a vehicle network. This time synchronization system includes a primary grand leader clock and a standby grand leader clock to synchronize multiple, independent time follower clocks to a common time. The time synchronization system is fault tolerant and takes into account the timing of an ignition cycle with respect to a failure and a subsequent recovery of a primary grand leader clock.

Figure 1:
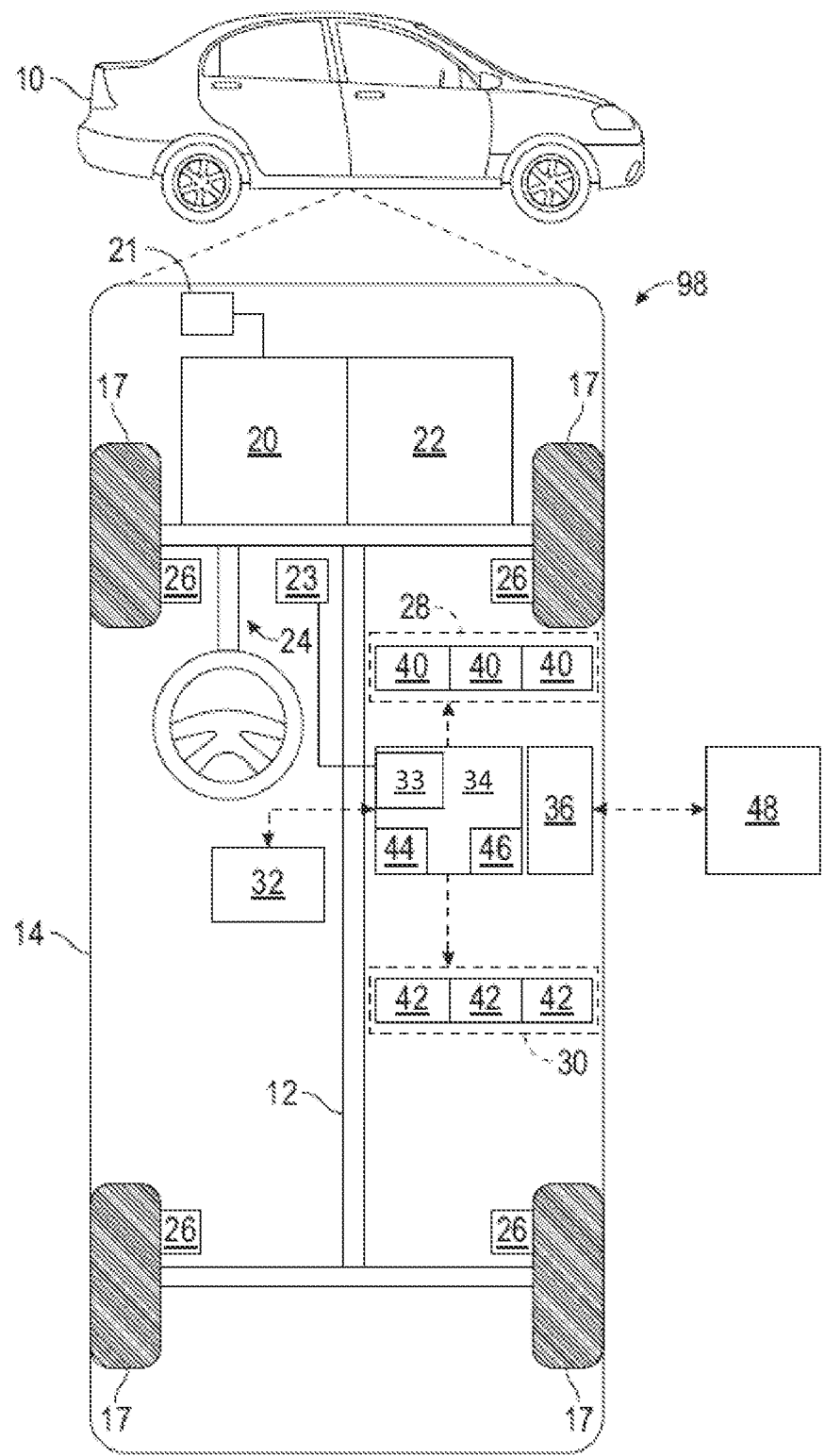
FIG. 1 is a schematic diagram of a vehicle having a control system with time synchronization according to an exemplary embodiment.

As depicted in FIG. 1, an example vehicle 10 generally includes a chassis 12, a body 14, and front and rear wheels 17. The body 14 is arranged on the chassis 12 and typically substantially encloses components of the vehicle 10. The body 14 and the chassis 12 may jointly form a frame. The wheels 17 are each rotationally coupled to the chassis 12 near a respective corner of the body 14. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., are also contemplated.

As shown, the vehicle 10 includes a vehicle control system 98 which is incorporated into the vehicle 10 for controlling different vehicle systems. In general, vehicle control system 98 is configured to receive sensor data from sensor system 28, analyze the data using a controller 34, and generate control signals that are sent to the actuator system 30 for enabling control of different vehicle systems. A time synchronization module 33 of controller 34 acts to synchronize multiple clocks in a network to a common time using a primary grand leader clock and a standby grand leader clock.

Different vehicle systems may include a propulsion system 20, a transmission system 22, a steering system 24, and a brake system 26. The vehicle also includes at least one data storage device 32 and a communication system 36 for communication between the different vehicle systems and subsystems. The communication system may include one or more different networks for the different vehicle systems or subsystems.

The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some examples, the steering system 24 may not include a steering wheel.

The sensor system 28 includes one or more sensors 40 (i.e., sensing devices) that sense conditions of the exterior environment and/or the interior environment of the vehicle 10. The sensors 40 are in communication with the controller 34 and may include, but are not limited to, one or more cameras (e.g., optical cameras and/or thermal cameras, such as one or more rear cameras and/or one or more front cameras), a speed sensor, one or more radar devices, one or more light detection and ranging (lidar) sensors, one or more ground penetrating radar (GPR) sensors, one or more global positioning system (GPS) devices, a steering angle sensor, ultrasonic sensors, one or more inertial measurement units (IMUs) and/or other sensors. Each sensor 40 is configured to detect one or more parameters, such as those related to the vehicle or its environment in the area surrounding the vehicle 10.

The sensor system 28 includes one or more Global Positioning System (GPS) devices configured to detect and monitor vehicle position related to route data (i.e., route information). The GPS device is configured to communicate with a GPS satellite to locate the position of the vehicle 10, such as with respect to a map of the area. The GPS device is in electronic communication with the controller 34. The sensor system 28 provides many signals to the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as temperature control, music, video, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by a remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The controller 34 includes multiple electronic control units (ECUs) that communicate with each other and other nodes over one or more suitable communication mediums and/or a combination of communication mediums, such as CAN, CAN FD, and/or Ethernet, and the like. ECUs can include micro-controllers running firmware or code to perform designated functions and to send messages to other ECUs within the vehicle. In examples, different ECUs in a vehicle may include some or all of the following: engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). ECUs with similar requirements and functional relations may be grouped together in domains, with specific ECUs that have been developed for the different domains, such as for infotainment, chassis and safety, powertrain, and body and security, or the like.

In general, the ECUs cooperate to process the sensor signals, perform logic, calculations, methods, and/or algorithms, and generate control signals to automatically control functions/features of the vehicle 10.

The communication module 36 facilitates communication between the ECUs and other devices included in the vehicle for monitoring and/or controlling various vehicle components.

The communication system 36 may also be configured to wirelessly communicate information between controller 34 and other entities 48, such as but not limited to, other vehicles (vehicle to vehicle "V2V" communication), infrastructure devices ("I2V" or "V2I" communication), remote systems, and/or personal devices. In an example, the communication system 36 is a wireless communication system configured to communicate via a wireless local area network (WLAN) using IEEE 802.11 standards, using cellular data communication, or using a dedicated short-range communications (DSRC) channel or the like. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle.

The controller 34 and/or ECUs include at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing various logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control components of the vehicle 10 based on the logic, calculations, methods, and/or algorithms.

The vehicle 10 may also include a user interface 23, which may be a display screen in the dashboard and including touchscreen capability for user input. The user interface 23 is in electronic communication with the controller 34 and is configured to receive inputs by a user (e.g., vehicle operator or passenger). Accordingly, the controller 34 is configured to receive inputs from the user via the user interface 23, such as to provide information from the user to the controller 34. The controller may generate queries for a user to be displayed or generate sound via the user interface 23. The user interface 23 includes a display configured to display information to the user (e.g., vehicle operator or passenger) and may include one or more speakers to provide an audible notification to the vehicle operator. The user interface 23 may be a driver information center (DIC) capable of providing information to the vehicle operator of the vehicle 10.

Figure 2:
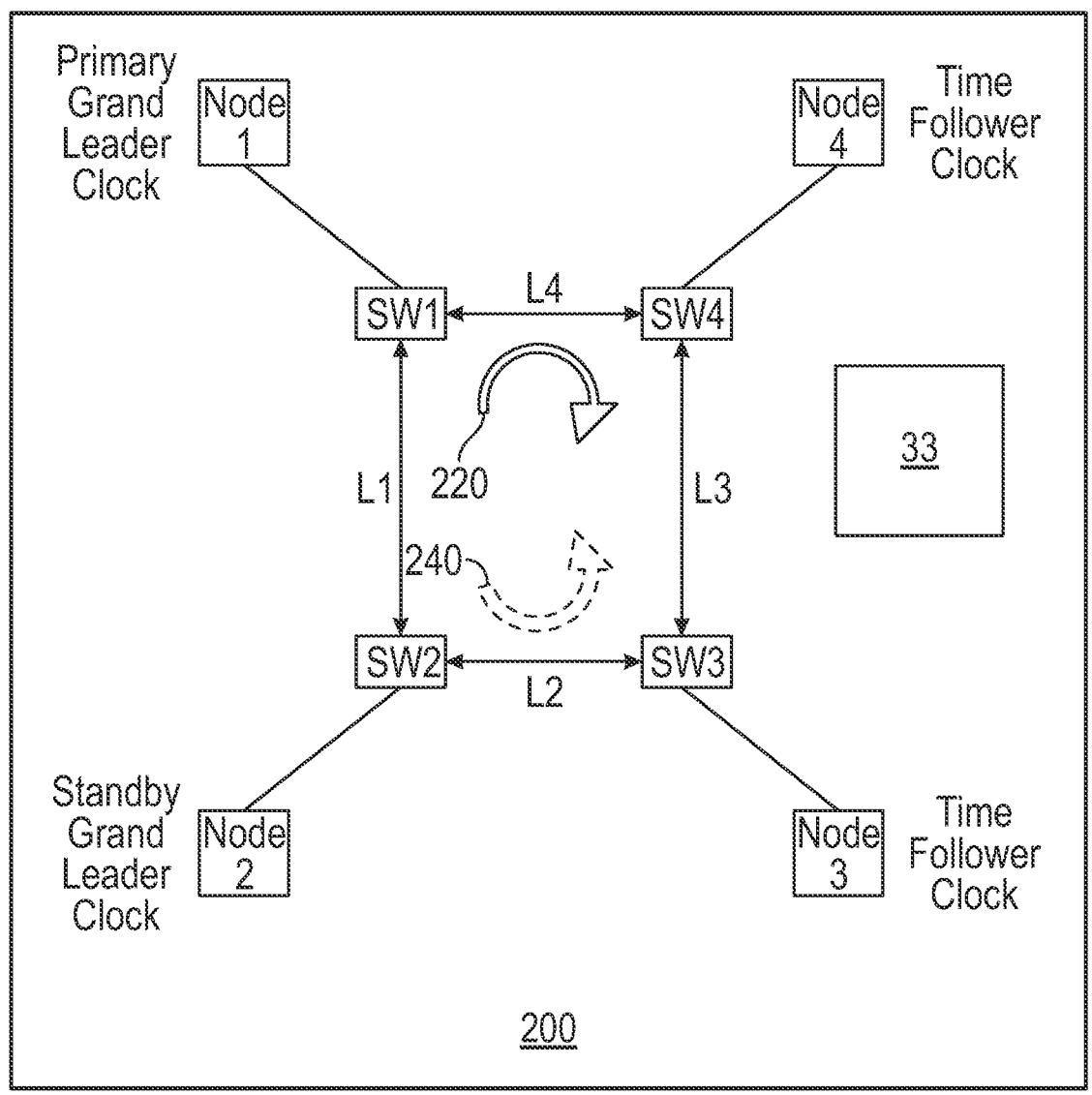
FIG. 2 is a schematic diagram of an example simplified network with two time domains for illustrating time synchronization of nodes in a control system.

Referring to FIG. 2, an example simplified network 200 of control system 98 is illustrated wherein clocks are synchronized to a primary or standby grand leader clock. Example network 200 is an Ethernet network and includes nodes 1-4 connected to each other via switches SW1, SW2, SW3, SW4 and links L1, L2, L3, and L4 as shown. Though only one node per switch is illustrated, each switch may be connected to multiple nodes and each node may be connected to one or more other nodes. The network is fault tolerant, in that synchronization of time follower clocks can occur if a failure or instability of a primary grand leader clock occurs or if a link failure occurs.

As illustrated, node 1 includes the primary grand leader clock and is referred to as a primary grand leader clock node. Similarly, node 2 includes a standby grand leader clock and is referred to as a standby grand leader clock node. Nodes 3 and 4 each include a time follower clock and each is referred to as a time follower node. The network 200 includes time synchronization module 33 in communication with, or formed as part of, the nodes of the network 200. Time synchronization module includes functionality to monitor the health of the primary grand leader clock and monitor the links between the nodes to detect link failures. Time synchronization module also includes clock selection functionality for the different nodes to select an appropriate grand leader clock for synchronization purposes according to network conditions.

As an overview, the time follower clocks of nodes 3 and 4 are primarily synchronized to the primary grand leader clock. If the primary grand leader clock fails, the standby grand leader clock takes over and the time follower clocks are each synchronized to the standby grand leader clock. If the primary grand leader clock recovers after a failure, then a determination is made whether a new ignition cycle has occurred between the time of failure and the time of recovery. If a new ignition cycle has occurred, then the time follower clocks are each synchronized to the primary grand leader clock again. If a new ignition cycle has not occurred, then the time follower clocks each continue to be synchronized to the standby grand leader clock to provide continuous synchronization and avoid a discontinuity in time that would otherwise occur if the time follower clock were to be synchronized to the primary grand leader clock, as explained with respect to FIG. 8.

Figure 8:
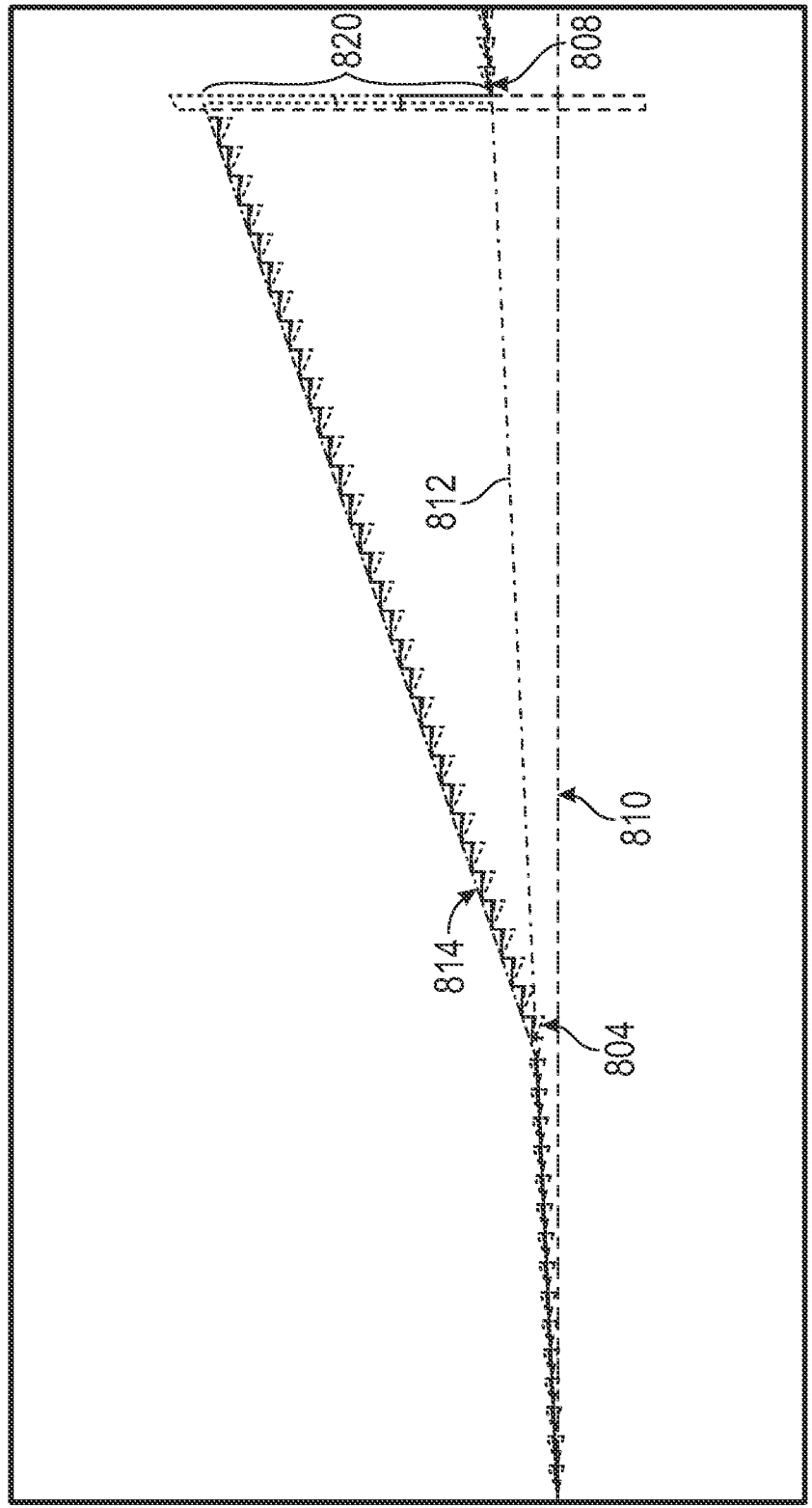
FIG. 8 is a graph of drift of a time follower node during an example time synchronization process.

FIG. 8 is a graph of an example synchronization of a time follower clock, wherein the horizontal axis indicates clock time and the vertical axis indicates synchronizing increments. An ideal clock would have no drift, indicated by line 810. The primary grand leader clock has a drift indicated by line 812. As shown, a time follower clock is initially synced with the primary grand leader clock for a period up to a time indicated by 804. A standby grand leader clock is also synchronized to the primary grand leader clock to time 804. At time 804, the primary grand leader clock fails, and the time follower clock is then synced with the standby grand leader clock for the period between time 804 and time 808. The drift of the standby grand leader clock, indicated by line 814, is different than that of the primary grand leader clock.

At a time 808, the primary grand leader clock has recovered. If the time follower clock is again synched with the primary grand leader clock at time 808, there is a discontinuity in a time that would be indicated by the time follower clock immediately before and immediately after a resynchronization with the primary grand leader clock (due to the different drifts of the primary and standby grand leader clocks). This discontinuity, or time difference, is indicated by 820 in FIG. 8. If a new ignition cycle has not occurred between time 804 and time 808, such a discontinuity is undesirable. In such a case, the standby grand leader clock follows the process illustrated in FIG. 4, and the time follower clock is remains synchronized with the standby grand leader clock. If a new ignition cycle has occurred, then a discontinuity is not a concern and synchronization with the primary grand leader clock is desirable.

Link failures may be addressed using the multiple time domains. In the example network 200 of FIG. 2, there are two time domains defined for time synchronization, time domain 1, illustrated with the solid arrow and reference number 220, and time domain 2, illustrated with the dotted arrow and reference number 240. Although this simplified example network 200 shows two time domains, more than two time domains are also contemplated.

The Automotive Open System Architecture (AUTOSAR) was created to standardize automotive software platforms. In an example, time synchronization module 33 may include a centralized AUTOSAR-based synchronized time base manager module to perform tasks described herein for the nodes that are synchronized to the primary grand leader clock. Each time follower node has associated clock selector functionality for selecting an appropriate synchronizing clock according to various conditions including primary grand leader clock health and link availability. The standby grand leader clock node also has clock selector functionality for selecting an appropriate synchronizing primary grand leader clock at appropriate times. Clock selector functionality may be provided by time synchronization module 33 for each time follower node and the standby grand leader clock node.

Figure 3:
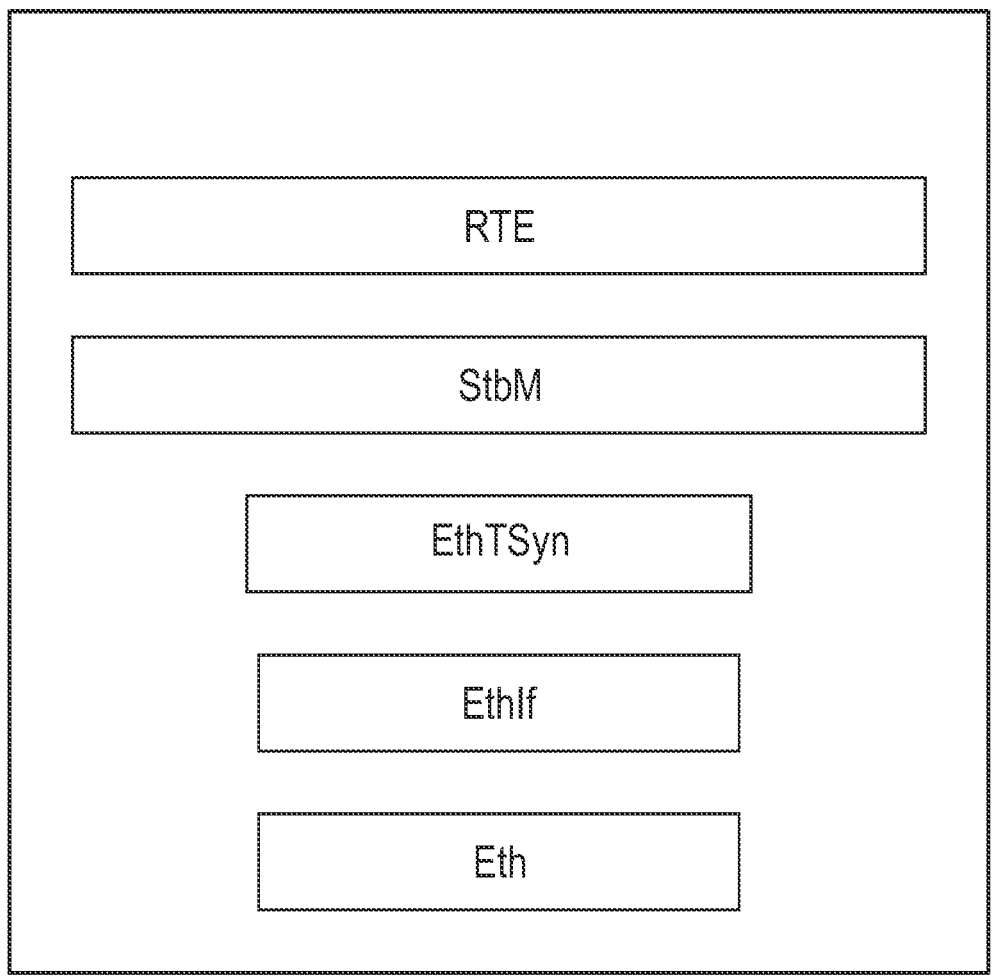
FIG. 3 is a simplified representation of software architecture for Ethernet time synchronization.

FIG. 3 illustrates a simplified representation of a software architecture for time synchronization of Ethernet connected nodes in vehicle 10. Layer RTE is the run time environment for software components. Layer StbM is a Synchronized Time Base Manager, which abstracts a respective bus-specific time base generator for different bus types (such as CAN, FlexRay, or Ethernet) to the run-time environment and makes a "presentation time" available for an application. An underlying layer to layer StbM is an EthTSyn (time synchronization over Ethernet) layer.

The EthTSyn layer is responsible for distributing a global time over an Ethernet bus. The EthTSyn layer synchronization may be based on the IEEE 802.1AS 2020 standard. The IEEE 802.1AS-2020 standard builds upon the IEEE 802.1 AS-2011 standard by including multiple time domains, to facilitate fault tolerance and redundancy, as further described herein. Time synchronization messages across a network are used to determine time delays between components of the network, including the switches and links. Different time domains are associated with different paths for the time synchronization messages. Measured time parameters of a time follower clock (local clock) relative to a grand leader clock are determined by persistently measuring the offsets of the local clock relative to local clocks of neighboring link partners, wherein an accumulation of the neighbor offsets is determined via time synchronization message. This allows for fast convergence of clocks when there is a change between the primary and standby grand leader clocks or a change in time domain because time parameters associated with nearest neighbors are persistently measured and are therefore known when a change occurs. A current time for a time follower clock can be determined based on a current time of the synchronizing clock and time parameters corresponding to the path between the time follower clock and the synchronizing grand leader clock.

The underlying layer EthIf is the Ethernet interface layer for the ETH physical layer. ETH layers such as ETHRTCV, ETHSWT, and ETHDRV provide for time stamping for egress and ingress data at a physical layer and an ETHTRCV module may initialize and configure an Ethernet transceiver (PHY) in a known manner.

Multiple time domains in the network 200 provide redundant synchronization functionality in the case of link failures. With respect to network 200 of FIG. 2, assume that node 4 is programmed such that a first time domain 220 of the primary grand leader clock is a predetermined default time domain to be used for time synchronization of the time follower clock. In this case, time parameters related to a path that includes switch SW1, link L4, and switch SW4 are used for time synchronization with respect to the primary grand leader clock first time domain 220. Link 4 is a relevant link for the primary grand leader clock in this example because time parameters for link 4 are used to synchronize node 4 with the primary grand leader clock via first time domain 220. If link L4 fails, then time follower clock of node 4 is programmed to instead change to a second time domain 240 of the primary grand leader clock for synchronization. Using time domain 240 means that time parameters related to a path that includes switch SW1, link L1, switch SW2, link L2, switch SW3, link L3 and SW4 are used for time synchronization. In another example, if time domain 240 is the default time domain for synchronization of time follower clock of node 3 with the primary grand leader clock, then L1 and L2 are relevant links and time domain 220 would be used in case of link failures of relevant link L1 or L2. If time domain 220 is the default time domain for synchronization of time follower clock of node 3 with the primary grand leader clock, then L4 and L3 are relevant links and time domain 240 would be used in case of link failures of relevant link L4 or L3.

Each time follower node is associated with a clock selector module to select a predetermined default time domain to be used with the primary grand leader clock when there are no failed relevant links. The clock selector module is enabled to select a predetermined redundant time domain to be used in case of a relevant link failure, and to switch between the time domains according to link conditions. As mentioned, a relevant link for a synchronizing clock is one that provides timing parameters for a time follower clock being synchronized according to a path that a synchronization time message would travel between the time follower clock and the synchronizing clock.

Similarly, when a standby grand leader clock is used for synchronizing a set of time follower clocks, a clock selector for each node would be enabled to select a predetermined default time domain to use with the standby grand leader clock when the network does not have failed links, and a time domain to use with the standby grand leader clock when a relevant link failure is detected, and to switch between them as appropriate. For example, if time domain 240 is the default time domain for synchronization of time follower clock of node 3 with the standby grand leader clock, then L2 is a relevant link and time domain 220 would be used in case of a link failure of relevant link L2. This appropriate selection of a clock and a time domain to be used for time synchronization may also be referred to as clock arbitration.

Figure 4:
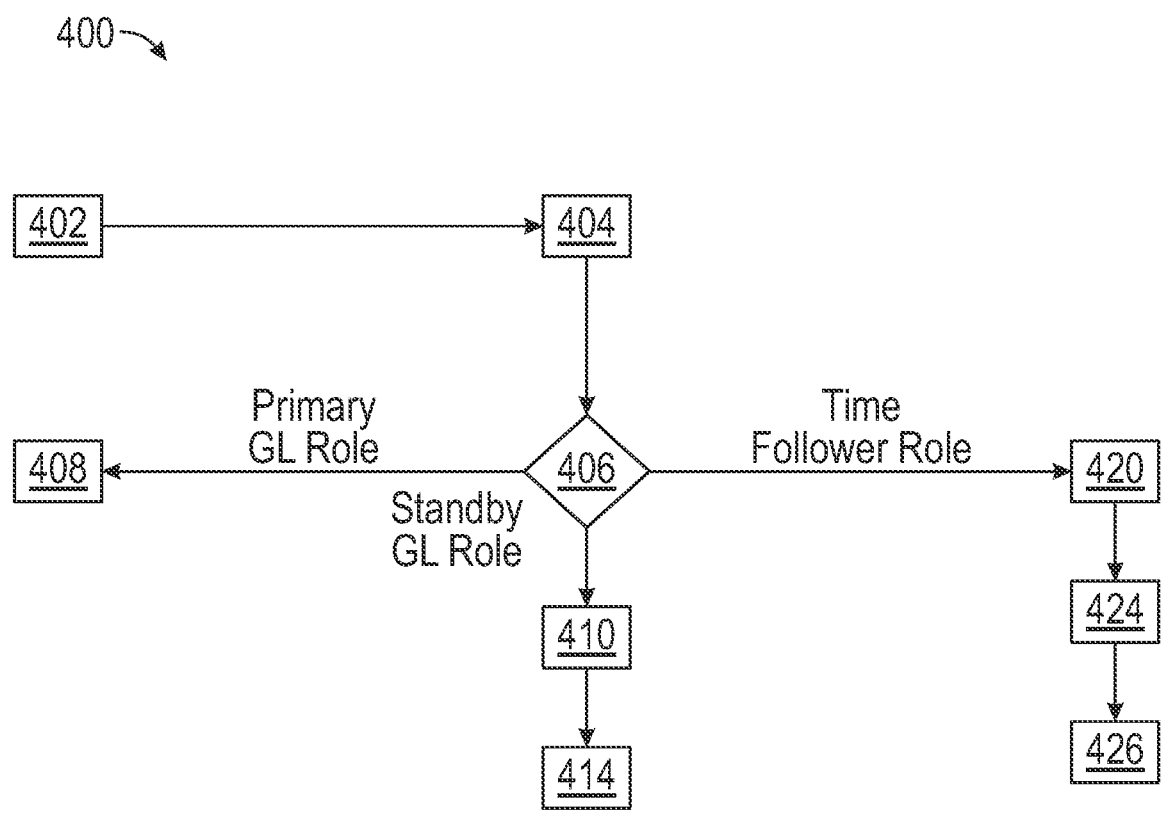
FIG. 4 is a flow chart of an example process for synchronizing multiple clocks including clock selection for different node types in a fault tolerant network.

FIG. 4 is a flow chart of an example process 400 for clock selection/arbitration for a set of nodes in a network, such as network 200.

The process begins at step 402 where the components and arrangement of components in a network, such as an AUTOSAR fault tolerant Ethernet network, are defined. Example network 200 includes a set of nodes connected via switches and links in a redundant manner, with a defined role for each node. As mentioned, the network 200 includes a grand leader clock node 1, a standby grand leader clock node 2, and one or more time follower clock nodes, nodes 3 and 4. Multiple time domains are defined and a clock tree for the network is determined, which defines a clock distribution network and clock synchronization paths. A clock selector or arbitration algorithm is designed to determine an appropriate synchronizing clock for each time follower clock node under various network conditions, wherein a selection is made for each time follower clock for an appropriate synchronizing clock from the primary and standby grand leader clocks and to also select an appropriate time domain from two or more defined time domains according to network conditions.

Processing then proceeds to step 404. At step 404, the Ethernet stack for the defined network is configured, by configuring the Eth, EthIf, EthTsyn and StbM modules, which together relate the physical time clocks to a software component that uses timing information of the nodes. Processing then proceeds to step 406.

At step 406, for each node of the network, a corresponding role of the node is determined. If the node has a primary grand leader role, then processing proceeds to step 408, described in conjunction with module 500, illustrated in FIG. 5. If the node has a standby grand leader role, then processing proceeds to step 410, described in conjunction with module 600, illustrated in FIG. 6. If the node has a time follower role, then processing proceeds to step 420, described in conjunction with module 700 illustrated in FIG. 7.

Figure 5:
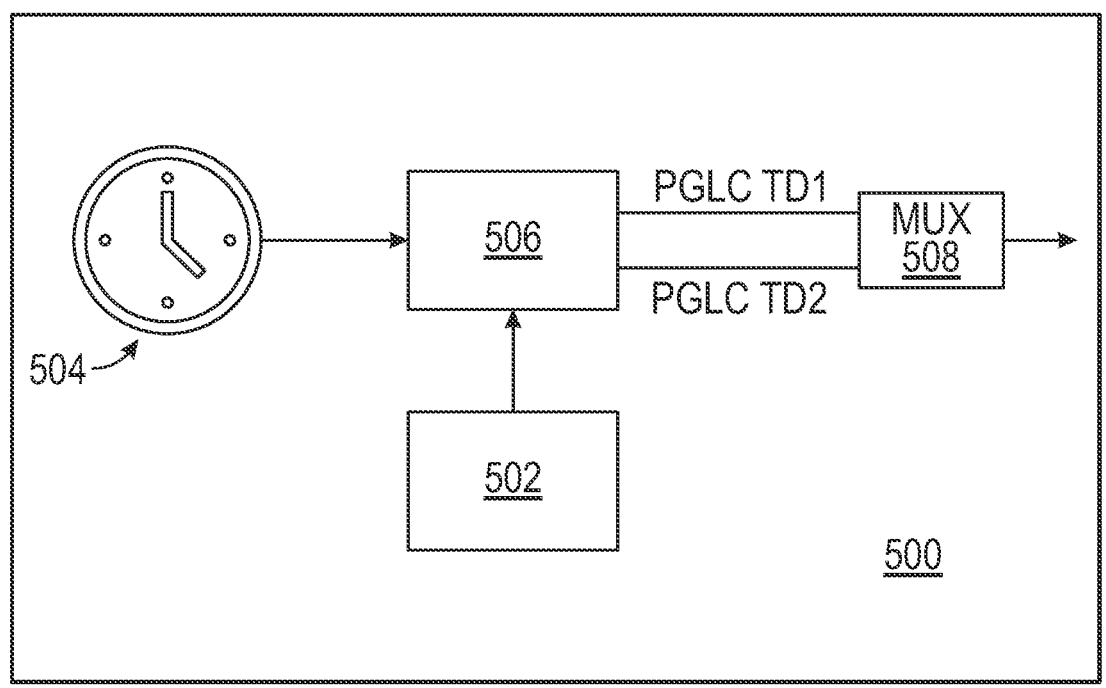
FIG. 5 is an example module for a primary grand leader clock node with two time domains.

At step 408, a primary grand leader clock node generates a multiple clock tree on the Ethernet port. FIG. 5 illustrates an example of a primary grand leader clock node 500 in a network with multiple time domains. The primary grand leader clock node determines how many time domains exist for the network via a domain number indicator 502. In the example of network 200, there are two defined time domains 220, 240. The primary grand leader clock node replicates its clock 504 via replicator 506 for each of the two time domains to generate a primary grand leader clock associated with a first time domain (indicated as PGLC TD1) and a primary grand leader clock associated with a second time domain (indicated as PGLC TD2). The clocks are sent to multiplexer 508 for appropriate distribution to the standby grand leader node and each time follower node as determined by the clock selector functionality and network conditions.

At step 410, a standby grand leader node chooses an appropriate time domain to use for synchronization with the primary grand leader clock and synchronizes its clock 604 with the primary grand leader clock when the primary grand leader clock is available via the selected time domain. Synchronizing the primary and standby grand leader clocks avoids time jumps during switchover upon a primary grand clock failure. The standby grand leader clock has a predetermined default primary time domain and a redundant primary time domain defined for synchronization with the primary grand leader clock. In the absence of failed relevant links, the standby grand leader clock is synchronized with the primary grand leader clock via the default primary time domain. If a relevant link has failed, then the standby grand leader clock 604 is synchronized with the primary grand leader clock via the redundant primary time domain. Processing then proceeds to step 414, wherein the standby grand leader clock generates a multiple clock tree on the Ethernet port to generate clocks to be used in the event of a primary grand leader clock failure.

Figure 6:
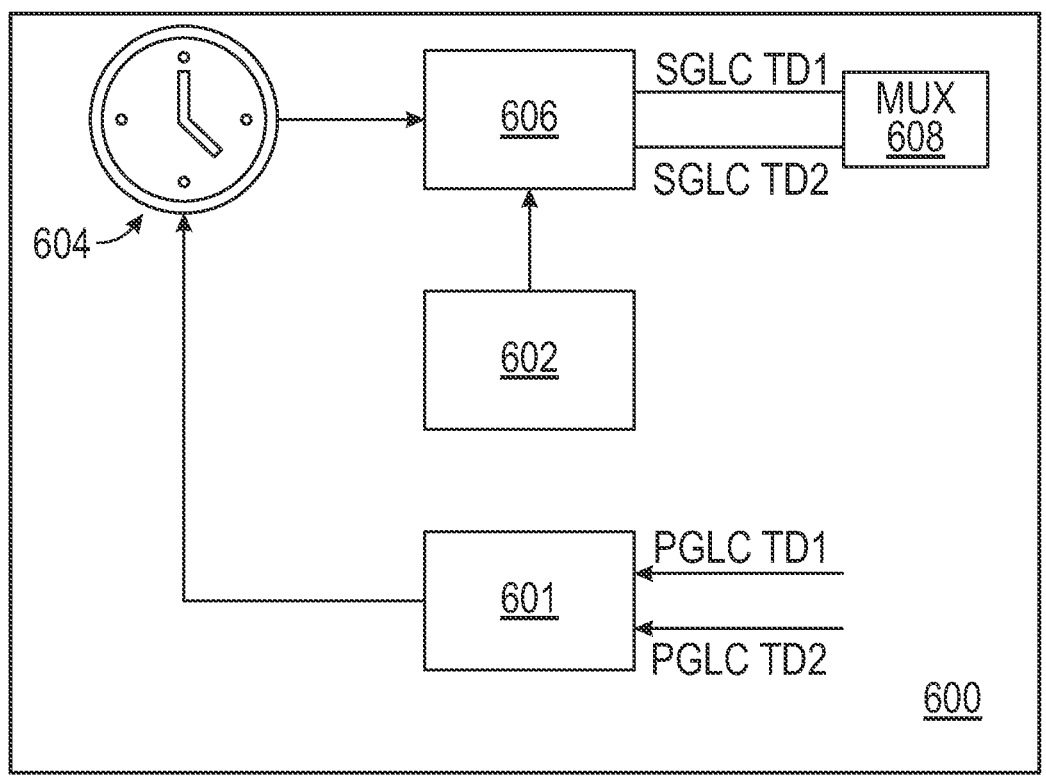
FIG. 6 is an example module for a standby grand leader clock node with two time domains.

FIG. 6 is an example module 600 for a standby grand leader clock node. Module 600 includes a clock selector 601, a domain number indicator 602, and a clock replicator 606. The clock selector 601 monitors link conditions and selects a chosen clock from the primary grand leader clock associated with first time domain (indicated as PGLC TD1) and the primary grand leader clock associated with second time domain (indicated as PGLC TD2) for when the primary grand leader clock is available and according to link conditions. One of PGLC TD1 and PGLC TD2 is designated as a default primary time domain and one is designated as the redundant primary time domain.

The replicator 606 replicates the standby grand leader clock 604 based on the domain number indicator 604. If there are two time domains, then replicator 604 generates a standby grand leader clock associated with the first time domain (SGLC TD1) and a standby grand leader clock associated with the second time domain (SGLC TD2). These two clocks are distributed via multiplexor 608 to the clock selector modules of time follower clock nodes for selection under appropriate conditions, such as when the primary grand leader clock is not available and synchronization with the standby grand leader clock is indicated.

Figure 7:
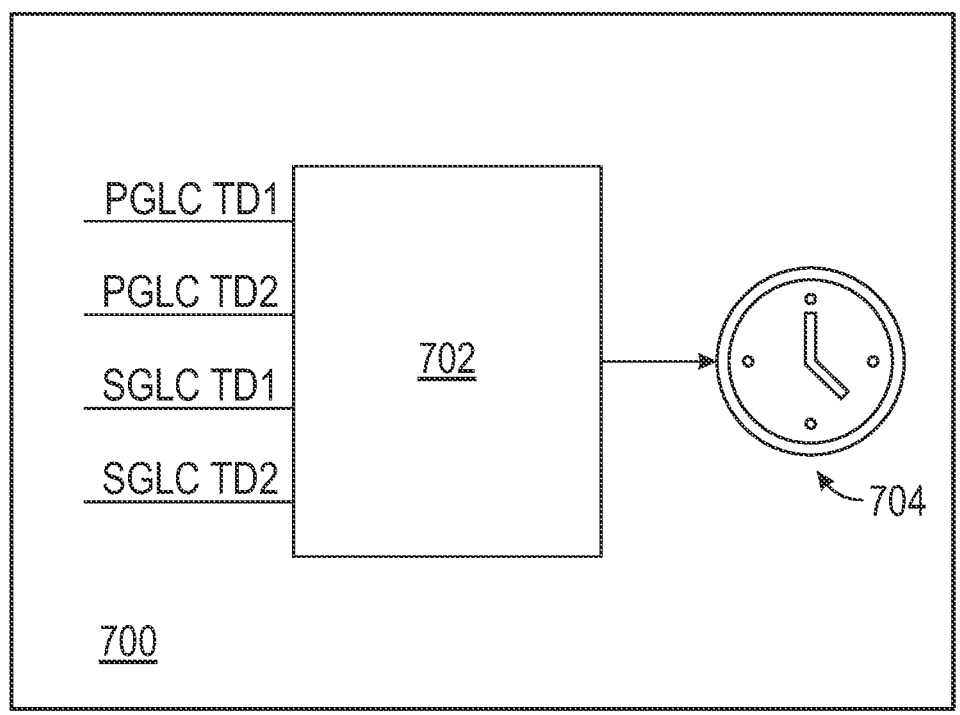
FIG. 7 is an example module for a time follower node with two time domains.

FIG. 7 is an example module 700 for a time follower node in the network 200 having two time domains. Module 700 includes clock selector 702, which acts to determine which clock to select and from which time domain (e.g. to select from PGLC TD1, PGLC TD2, SGLC TD1, and SGLC TD2 in network 200) based on network conditions and based on the predetermined defined default and redundant time domains for the primary grand leader clock and the standby grand leader clock. The chosen clock/time domain is used to synchronize the time follower node clock 704 according to the time follower clock node process of FIG. 4.

At step 420, for each time follower clock, at initialization of an ignition cycle, a primary grand leader clock for a default primary time domain (e.g., time domain 220 or time domain 240) is selected as the highest priority clock for synchronization. The availability of the primary grand leader clock 504 is monitored, and link failures are monitored. If a failure of a relevant link occurs, the primary grand leader clock for the redundant primary time domain is selected. At step 424, upon detection of a failure of the primary grand leader clock 504, the standby grand leader clock 604 is selected as the synchronizing clock, for the predetermined default standby time domain (e.g., time domain 220 or time domain 240). If a failure of a relevant link occurs when the standby grand leader clock is the synchronizing clock, then synchronization changes to the redundant standby time domain.

At step 426, upon detection of recovery of the primary grand leader clock, a check is made as to whether a new ignition cycle has occurred between the failure and the recovery of the primary grand leader clock. If a new ignition cycle has not occurred, then synchronization with the standby grand leader clock 604 is continued. If a new ignition cycle has occurred, then the primary grand leader clock is selected (via an appropriate time domain) for synchronization of the time follower node clock 704. In this manner, time discontinuities are avoided.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for synchronization of multiple clocks in a vehicle network includes a processor and a memory, the memory including instructions such that the processor is programmed to:
   synchronize a time follower clock in the vehicle network to a primary grand leader clock upon initialization of an ignition cycle;
   monitor the primary grand leader clock to detect a failure of the primary grand leader clock and to detect a recovery after failure of the primary grand leader clock;
   synchronize the time follower clock to a standby grand leader clock upon the failure of the primary grand leader clock;
   determine whether a new ignition cycle has occurred between the failure of the primary grand leader clock and the recovery after failure of the primary grand leader clock;
   synchronize the time follower clock to the primary grand leader clock if the new ignition cycle has occurred between the failure of the primary grand leader clock and the recovery after failure of the primary grand leader clock; and
   continue to synchronize the time follower clock to the standby grand leader clock if the new ignition cycle has not occurred between the failure of the primary grand leader clock and the recovery after failure of the primary grand leader clock.

2. The system of claim 1, wherein the vehicle network is an Ethernet network.

3. The system of claim 1, wherein a node of the time follower clock is in electronic communication with a node of the primary grand leader clock and a node of the standby grand leader clock via switches and links in a redundant manner.

4. The system of claim 1, wherein the processor is further programmed to:
   generate a first primary replicated clock for a first time domain and a second primary replicated clock for a second time domain;
   designate the first primary replicated clock as a highest priority clock for synchronization of the time follower clock when synchronization to the primary grand leader clock is indicated and all relevant primary links are available; and
   designate the second primary replicated clock as a redundant primary clock for synchronization of the time follower clock when synchronization to the primary grand leader clock is indicated and a corresponding relevant primary link is unavailable.

5. The system of claim 1, wherein the processor is further programmed to:
   generate a first standby replicated clock for a first time domain and a second standby replicated clock for a second time domain;
   designate the first standby replicated clock as a highest priority clock for synchronization of the time follower clock when synchronization to the standby grand leader clock is indicated and all relevant standby links are available; and
   designate the second standby replicated clock as a redundant standby clock for synchronization of the time follower clock when synchronization to the standby grand leader clock is indicated and a relevant standby link is unavailable.

6. The system of claim 1, wherein the processor is further programmed to:
   determine a current time of the time follower clock based on a current time of a synchronizing clock and a set of time parameters corresponding to a path between the time follower clock and the synchronizing clock.

7. The system of claim 6, wherein the processor is further programmed to:
   designate a default primary time domain associated with a first path between the time follower clock and the primary grand leader clock and designate a redundant primary time domain associated with a second path between the time follower clock and the primary grand leader clock; and
   monitor whether a relevant primary link of the first path is unavailable when the primary grand leader clock is the synchronizing clock,
   wherein, when the primary grand leader clock is the synchronizing clock, the current time of the time follower clock is determined based on the default primary time domain when all relevant primary links are available and is determined based on the redundant primary time domain when a relevant primary link is unavailable.

8. The system of claim 7, wherein the processor is further programmed to:
designate a default standby time domain associated with a first path between the time follower clock and the standby grand leader clock and designate a redundant primary time domain associated with a second path between the time follower clock and the standby grand leader clock; and
monitor whether a relevant standby link of the first path is unavailable when the standby grand leader clock is the synchronizing clock,
wherein, when the standby grand leader clock is the synchronizing clock, the current time of the time follower clock is determined based on the default standby time domain when all relevant standby links are available and is determined based on the redundant standby time domain when a relevant standby link is unavailable.

9. A system for synchronization of multiple clocks in a vehicle network includes a processor and a memory, the memory including instructions such that the processor is programmed to:
synchronize each time follower clock of a set of time follower clocks in the vehicle network to a primary grand leader clock via a corresponding predetermined primary time domain of multiple time domains;
synchronize a standby grand leader clock in the vehicle network to the primary grand leader clock via a corresponding predetermined primary time domain of the multiple time domains;
monitor the primary grand leader clock to detect a failure of the primary grand leader clock and to detect a recovery after a failure of the primary grand leader clock;
synchronize, upon the failure of the primary grand leader clock, each time follower clock to the standby grand leader clock via a corresponding predetermined standby time domain of the multiple time domains;
determine whether a new ignition cycle has occurred between a failure of the primary grand leader clock and a recovery after a failure of the primary grand leader clock;
synchronize each time follower clock to the primary grand leader clock via the corresponding predetermined primary time domain if the new ignition cycle has occurred between a failure of the primary grand leader clock and a recovery after failure of the primary grand leader clock; and
continue to synchronize each time follower clock to the standby grand leader clock via the corresponding predetermined standby time domain if the new ignition cycle has not occurred between a failure of the primary grand leader clock and a recovery after failure of the primary grand leader clock.

10. The system of claim 9, further including a clock selector module enabled to select a default or a redundant primary time domain from the multiple time domains for synchronization of each time follower clock to the primary grand leader clock in accordance with link conditions.

11. The system of claim 10, wherein the clock selector module is enabled to select a default or a redundant standby time domain from the multiple time domains for synchronization of each time follower clock to the standby grand leader clock in accordance with link conditions.

12. The system of claim 10, wherein the clock selector module is enabled to select a default or a redundant primary time domain from the multiple time domains for synchronization of the standby grand leader clock to the primary grand leader clock in accordance with link conditions.

13. A method for synchronization of multiple clocks in a vehicle network comprising:
synchronizing a time follower clock in the vehicle network to a primary grand leader clock upon initialization of an ignition cycle;
detecting a failure of the primary grand leader clock and a recovery after failure of the primary grand leader clock;
synchronizing the time follower clock to a standby grand leader clock upon the failure of the primary grand leader clock;
determining that a new ignition cycle has not occurred between the failure of the primary grand leader clock and the recovery after failure of the primary grand leader clock; and
maintaining synchronization of the time follower clock with the standby grand leader clock after determining that the new ignition cycle has not occurred between the failure of the primary grand leader clock and the recovery after failure of the primary grand leader clock.

14. The method of claim 13, wherein the vehicle network is an Ethernet network.

15. The method of claim 13, wherein the vehicle network is a redundant network for a node of the time follower clock with respect to a node of the primary grand leader clock.

16. The method of claim 15, further comprising:
designating a default primary time domain for synchronization of the time follower clock to the primary grand leader clock and designating a redundant primary time domain for synchronization of the time follower clock to the primary grand leader clock for when a relevant primary link is unavailable;
monitoring availability of relevant primary links;
synchronizing the time follower clock to the primary grand leader clock via the default primary time domain when synchronization with the primary grand leader clock is indicated and all relevant primary links are available; and
synchronizing the time follower clock to the primary grand leader clock via the redundant primary time domain when synchronization with the primary grand leader clock is indicated and a relevant primary link is unavailable.

17. The method of claim 16, further comprising:
designating a default standby time domain for synchronization of the time follower clock to the standby grand leader clock and designating a redundant standby time domain as a redundant time domain for synchronization of the time follower clock to the standby grand leader clock for when a relevant standby link is unavailable;
monitoring availability of relevant standby links;
synchronizing the time follower clock to the standby grand leader clock via the default standby time domain when synchronization with the standby grand leader clock is indicated and all relevant standby links are available; and
synchronizing the time follower clock with the standby grand leader clock via the redundant standby time domain when synchronization with the standby grand leader clock is indicated and a relevant standby link is unavailable.

18. The method of claim 16, further comprising:
designating a default primary time domain for synchronization of the standby grand leader clock to the primary grand leader clock and designating a redundant primary time domain for synchronization of the standby grand leader clock to the primary grand leader clock for when a relevant primary link is unavailable;
monitoring availability of relevant primary links;
synchronizing the standby grand leader clock to the primary grand leader clock via the default primary time domain when synchronization with the primary grand leader clock is indicated and all relevant primary links are available; and
synchronizing the standby grand leader clock to the primary grand leader clock via the redundant primary time domain when synchronization with the primary grand leader clock is indicated and a relevant primary link is unavailable.

19. The method of claim 13, further comprising:
generating a first primary replicated clock for a first time domain and a second primary replicated clock for a second time domain;
designating, for each time follower clock of a set of time follower clocks in the vehicle network, the first primary replicated clock or the second primary replicated clock to be a corresponding highest priority clock;
selecting, for each time follower clock of the set of time follower clocks, a corresponding highest priority clock for synchronization of the time follower clock with the primary grand leader clock when all relevant links are available and synchronization with the primary grand leader clock is indicated.

20. The method of claim 13, further comprising:
generating a first standby replicated clock for a first time domain and a second standby replicated clock for a second time domain;
designating, for each time follower clock of a set of time follower clocks in the vehicle network, the first standby replicated clock or the second standby replicated clock to be a corresponding higher priority clock; and
selecting, for each time follower clock of the set of time follower clocks, a corresponding higher priority clock for synchronization of the time follower clock with the standby grand leader clock when all relevant links are available and synchronization with the standby grand leader clock is indicated.

* * * * *